(12) United States Patent
Mukojima

(10) Patent No.: US 7,865,077 B2
(45) Date of Patent: Jan. 4, 2011

(54) OPTICAL COMMUNITION SYSTEM WITH N + 1 REDUNDANCY

(75) Inventor: Toshiaki Mukojima, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 622 days.

(21) Appl. No.: 11/783,479

(22) Filed: Apr. 10, 2007

(65) Prior Publication Data
US 2008/0037981 A1 Feb. 14, 2008

(30) Foreign Application Priority Data
May 31, 2006 (JP) .............................. 2006-151826

(51) Int. Cl.
*H04J 14/08* (2006.01)
(52) U.S. Cl. ...................... 398/1; 398/2; 398/5; 398/8; 398/9; 398/10; 398/17; 398/22; 398/35; 398/66
(58) Field of Classification Search .................. 398/1–9, 398/12, 17, 19, 22, 34–36, 45, 58–75
See application file for complete search history.

(56) References Cited

U.S. PATENT DOCUMENTS

| | | | |
|---|---|---|---|
| 6,915,075 B1* | 7/2005 | Oberg et al. ................... | 398/9 |
| 7,099,578 B1* | 8/2006 | Gerstel .......................... | 398/5 |
| 2002/0027682 A1* | 3/2002 | Iwasaki et al. ............... | 359/110 |
| 2002/0071149 A1* | 6/2002 | Xu et al. ....................... | 359/110 |
| 2002/0085492 A1* | 7/2002 | Mukai et al. ................. | 370/230 |
| 2004/0095884 A1* | 5/2004 | Lee et al. ...................... | 370/235 |
| 2004/0213256 A1* | 10/2004 | Muys et al. ............... | 370/395.1 |
| 2005/0084262 A1* | 4/2005 | Oberg et al. ................... | 398/19 |
| 2005/0276603 A1* | 12/2005 | Jung et al. ..................... | 398/71 |
| 2007/0058973 A1* | 3/2007 | Tanaka .......................... | 398/1 |
| 2008/0232819 A1* | 9/2008 | Mukai ........................ | 398/168 |

FOREIGN PATENT DOCUMENTS

| | | | |
|---|---|---|---|
| JP | 2001-203735 | * | 7/2001 |
| JP | 2003-008678 | | 1/2003 |
| JP | 2005-328294 | | 11/2005 |
| WO | WO 2005046138 | * | 5/2005 |

OTHER PUBLICATIONS

Gerstel et al: "Optical Layer Survivability-An Implementation Perspective", IEEE J. Selected Areas in Communications, vol. 18, No. 10, Oct. 2000, pp. 1885-1890.*

* cited by examiner

*Primary Examiner*—Li Liu
(74) *Attorney, Agent, or Firm*—Rabin & Berdo, PC

(57) ABSTRACT

An optical communication system has two or more active interfaces, each controlling the transmission and reception of optical signals between a communication network and one or more subscriber terminals according to control information pertaining to the individual subscriber terminals. The control information used by all the active interfaces is stored in a memory. The optical communication system also has a standby interface that is functionally equivalent to the active interfaces, and an optical switching apparatus that switches data transmission paths among the network, the active and standby interfaces, and the subscriber terminals. If a fault is detected in an active interface, the standby interface extracts the control information of the faulty interface from the memory, and the optical switching apparatus switches the data transmission paths so that the standby interface replaces the faulty interface.

13 Claims, 7 Drawing Sheets

OPTICAL COMMUNITION SYSTEM WITH N + 1 REDUNDANCY

BACKGROUND OF THE INVENTION

1. Field of the Invention

The present invention relates to a point-to-multipoint optical communication system with a standby interface that can be used in case of failure of another interface.

2. Description of the Related Art

The rapid build-up of an installed base of asymmetric digital subscriber lines (ADSL) and other broadband subscriber communication lines has led service providers to begin providing services that require high-speed communication. To expand these services, a still faster and more stable broadband infrastructure will be necessary, which makes the extension of optical fiber to the home (FTTH) increasingly attractive. A known means of providing FTTH service at a low cost is the passive optical network (PON), in which a plurality of users share a single optical fiber. The term PON designates a network with a star topology that uses a passive optical coupler to form a point-to-multipoint communication system.

FIG. 1 shows the general scheme of a point-to-multipoint communication system using PON technology. An optical line terminal (OLT) at a telephone switching office is connected by optical fiber to a wide area network (WAN) 600. The OLT 100 has a PON interface (IF) card that uses a time-division technique to multiplex data received from the WAN 600 into downstream frames for transmission to a plurality of subscribers. The multiplexed data frames are transmitted on an optical fiber 200 to an optical coupler, which passively branches all the data frames onto a plurality of optical fiber subscriber lines 201, 202, 203 leading to optical network units (ONU) 401, 402, 403 installed on subscriber premises. Each ONU uses an identifier attached to the frames to select the frames addressed to it and converts these frames to electrical signals. The electrical signals are sent to subscriber terminal equipment 501, 502, 503. The identifiers are assigned by the OLT 100 in a registration process carried out when the ONUs are installed. The OLT manages the identifiers to make sure that no two ONUs connected to it have the same identifier.

In the upstream direction, an ONU converts an electrical data signal received from subscriber terminal equipment to upstream optical data frames that are transmitted through the coupler 300 to the OLT 100 at timings designated by the OLT 100. The OLT 100 controls the timings and the amount of data per frame so that frames from different ONUs do not collide in the optical coupler 300. The OLT 100 receives the upstream frames and sends them to the WAN 600.

As shown in FIG. 2, a plurality of PON interface cards may be installed in a single OLT 101. These cards (PON IF #1 to PON IF #M) are connected to respective 1:N optical couplers 300-1 to 300-M, each of which can branch an incoming signal onto N subscriber lines, enabling the OLT 101 to connect with up to M×N ONUs (ONU #1-1 to ONU #1-N, ONU #2-1 to ONU #2-N, . . . , ONU #M-1 to ONU #M-N), where M and N are integers greater than unity. By increasing the number of ONUs connectable to a single OLT, this scheme uses system resources more efficiently.

This type of point-to-multipoint system may have built-in redundancy, enabling it to continue communication even if a fault occurs on a data transmission path between the OLT in the telephone switching office and a subscriber's ONU. That is, the system may include active data transmission paths which are used normally, and one or more standby data transmission paths to which it can switch over when a fault occurs on one of the active paths.

Japanese Patent Application Publication No. 2005-328294 discloses a dual OLT (master device) with two independent PON interfaces connected by different optical fibers to the same coupler and thus to the same ONUs (slave devices). If the active interface fails, communication is immediately switched over to the standby interface, without changing the phase of the optical signals received at the ONUs. The faulty interface can then be replaced while the good interface continues to operate. This disclosure, however, does not contemplate the situation in FIG. 2, in which an OLT has multiple active PON interfaces.

If one of the PON interfaces in FIG. 2 fails, it would be desirable to have a standby interface to which the failed interface could be switched over without affecting the other active interfaces. A problem is that each PON interface operates according to its own control information, specifying such parameters as the round trip time between the OLT and each ONU, by which it controls transmissions so as to avoid collisions. Differences between the control information held by different PON interfaces would make it difficult for a single standby interface to be capable of immediately replacing any active interface that failed.

Providing a separate standby PON interface for each active PON interface would greatly limit the number of active interfaces that could be installed in a single OLT. In view of the expected high demand for FTTH service, there is a need for a more efficient form of redundancy.

SUMMARY OF THE INVENTION

An object of the present invention is to provide an optical communication system with a standby PON interface that can efficiently replace any of a plurality of active PON interfaces.

An optical communication system according to the present invention has a plurality of first interfaces, each connectable to a plurality of subscriber terminals. Each first interface controls the transmission and reception of optical signals between a communication network and a subset of the plurality of subscriber terminals according to control information pertaining to the individual subscriber terminals. The optical communication system includes a memory for storing the control information used by all the first interfaces, a second interface that is functionally equivalent to the first interfaces, and a data transmission path forming apparatus that forms data transmission paths between the communication network and the first and second interfaces, and between the first and second interfaces and the subscriber terminals.

The optical communication also has a fault monitor that detects faults in the first interfaces and generates a signal indicating which first interface is faulty, an extractor that extracts control information from the memory, and a switching apparatus that switches the data transmission paths formed by the data transmission path forming apparatus. When a fault is detected in a first interface, the extractor extracts the control information pertaining to the subscriber terminals connected to the faulty first interface from the memory, and the switching apparatus switches the data transmission paths so that the paths that led to the faulty first interface now lead to the second interface.

The second interface then operates with the control information extracted by the extractor, taking the place of the faulty first interface. In the meantime the faulty first interface can be repaired or replaced, then switched back into operation by the switching apparatus, leaving the second interface free to replace another first interface in the event of a failure.

This redundancy scheme is efficient because it requires only one standby interface for a plurality of active interfaces, yet it enables interface faults to be handled with little or no interruption of service to subscribers.

DETAILED DESCRIPTION OF THE INVENTION

Figure 1:
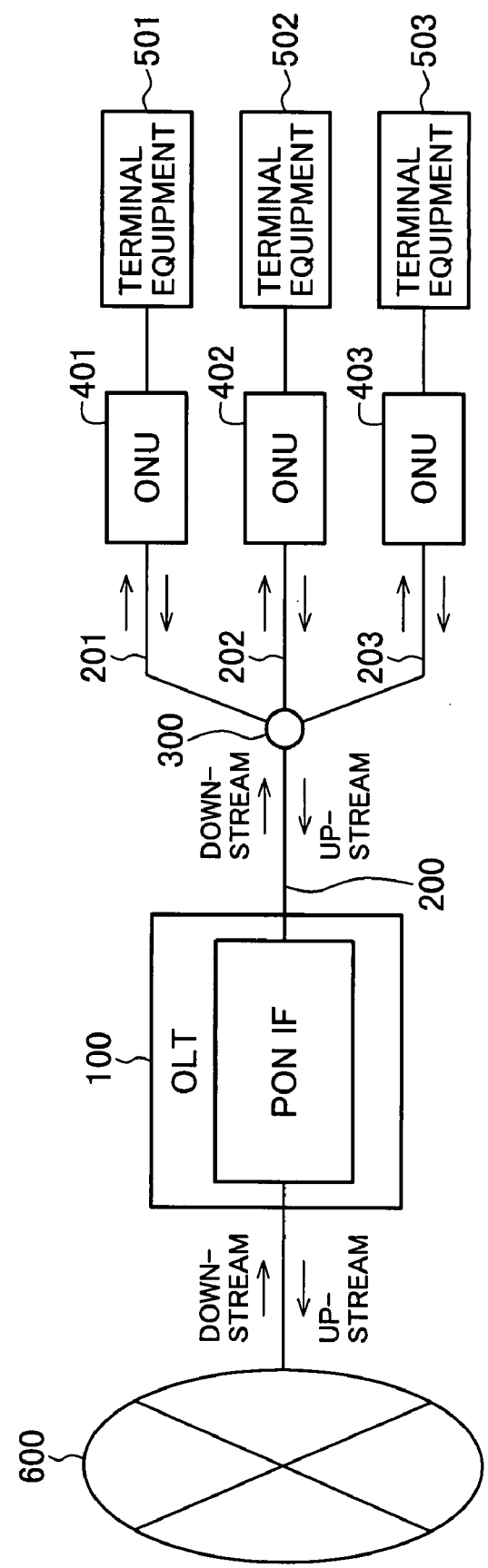
FIG. 1 is a block diagram showing the structure of a conventional point-to-multipoint optical communication system.
Figure 2:
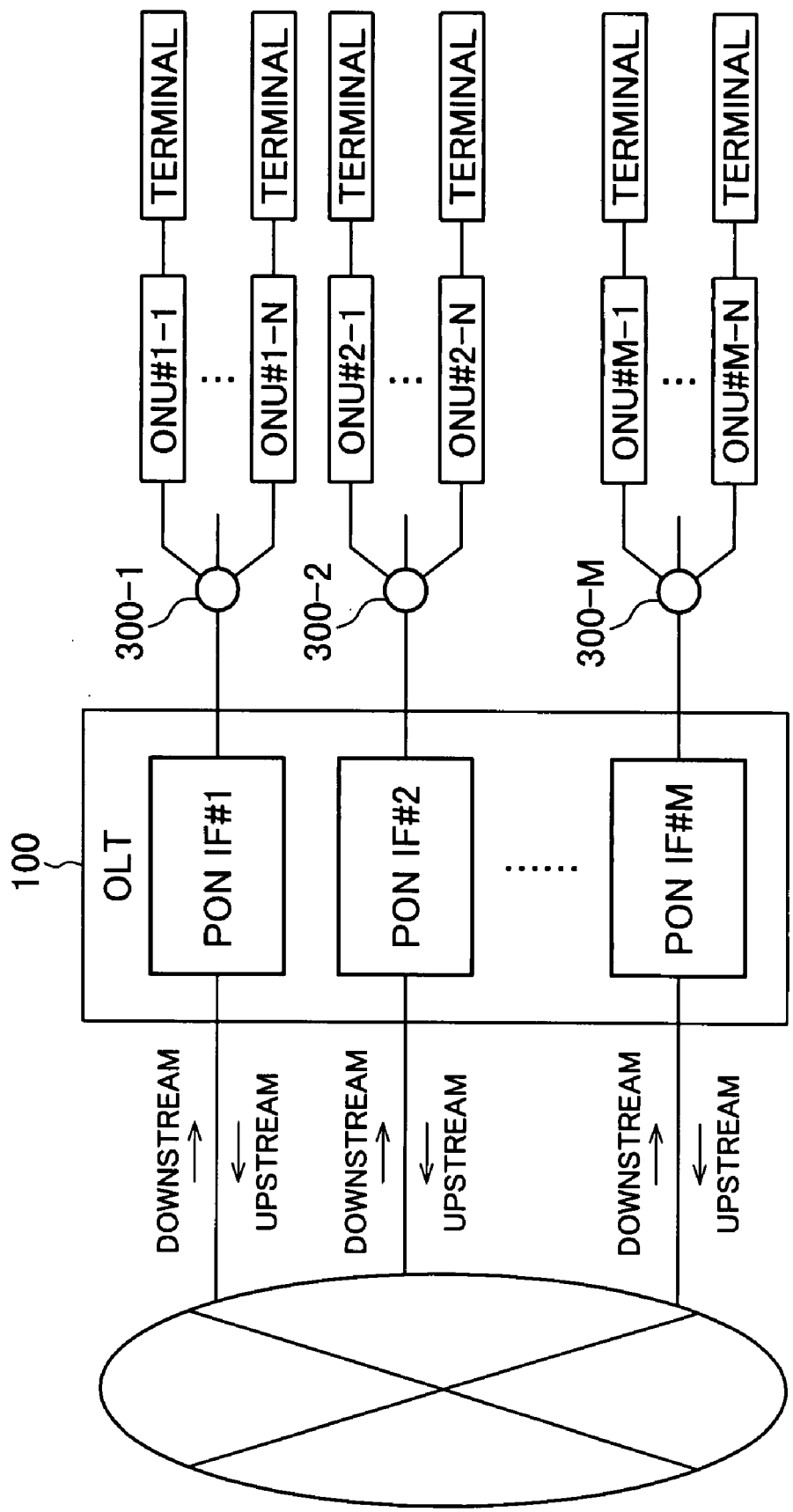
FIG. 2 is a block diagram showing a conventional point-to-multipoint optical communication system having a plurality of interface cards.

An embodiment of the invention will now be described with reference to the attached drawings, in which like elements are indicated by like reference characters.

Figure 3:
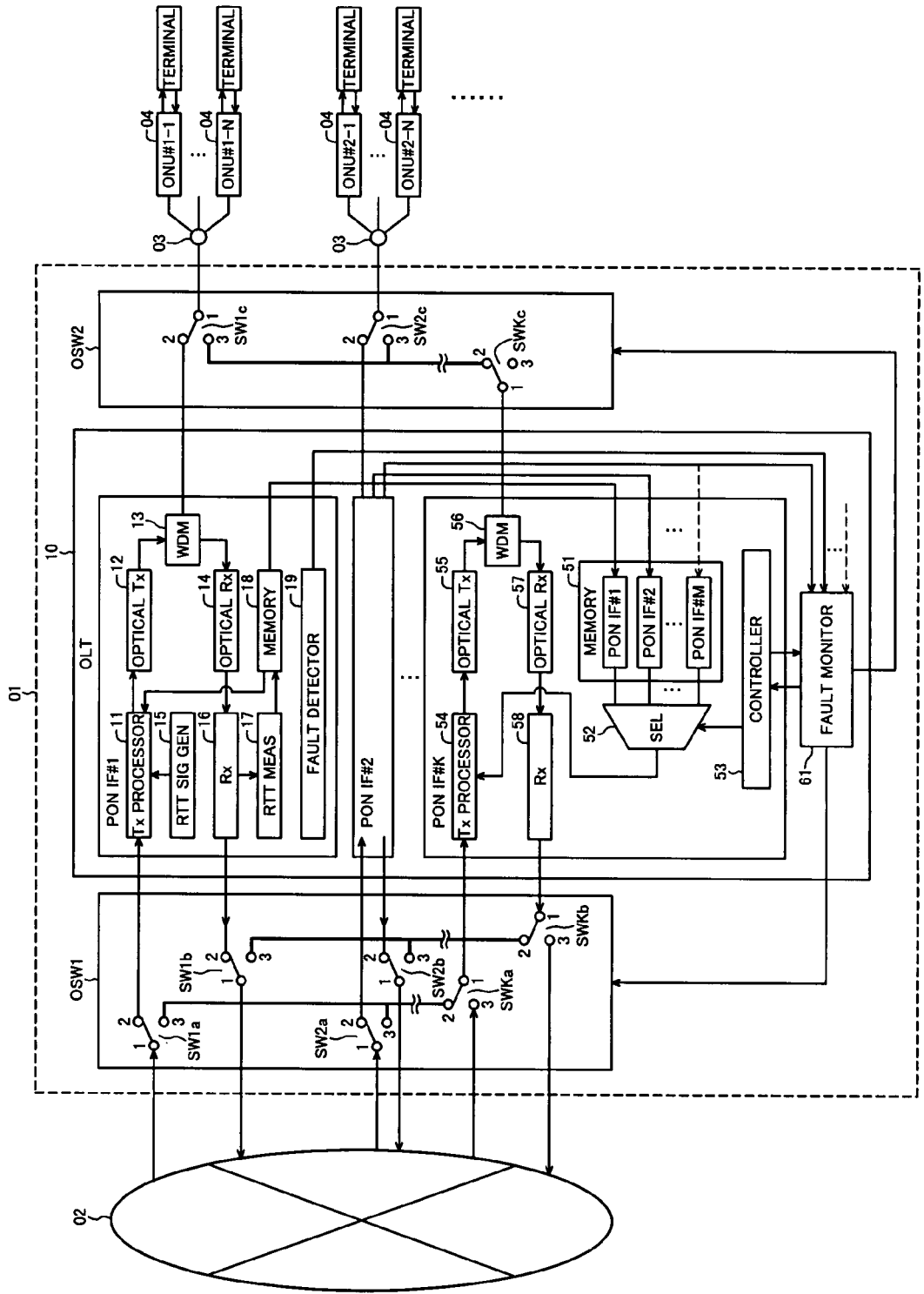
FIG. 3 is a block diagram showing the structure of a point-to-multipoint optical communication system according to the present invention.

Referring to FIG. 3, the embodiment is a point-to-point optical communication system 01 comprising an optical line terminal (OLT) 10 and a pair of optical switching units OSW1, OSW2.

The OLT 10 may be installed in, for example, a telecommunication switching office operated by a telecommunication company and connected to a wide area network (WAN) 02 such as the Internet. The OLT 10 includes M interface cards PON IF#1 to PON IF#M (only PON IF#1 and PON IF#2 are shown) that control optical communication between the wide area network 02 and a plurality of optical network units (ONUs) 04 installed on subscriber premises, and a standby interface card PON IF#K that can function as a replacement for any of these M interface cards (M is an integer greater than unity). All of the interface cards are detachably mounted in the OLT 10. Interface cards PON IF#1 to PON IF#M will also be referred to as the active interface cards, since they are normally active. The standby interface card PON IF#K is normally inactive. The OLT 10 also has a fault monitor and control unit 61 that monitors the active interface cards PON IF#1 to PON IF#M and communicates with the standby interface card PON IF#K.

Each of the M interface cards PON IF#1 to PON IF#M is connected to a plurality of ONUs 04 through an optical coupler 03. The optical coupler 03 passively branches an optical signal from the interface card onto optical fibers connected to up to N ONUs 04, and passively combines optical signals from this optical fibers onto a signal optical fiber leading to the interface card, enabling the OLT 10 to connect with up to M×N ONUs 04 (N is an integer greater than unity).

All M interface cards PON IF#1 to PON IF#M have the same structure and function. Each of these interface cards comprises a transmitting (Tx) processor 11, an optical transmitter (Tx) 12, a wave division multiplexer (WDM) 13, an optical receiver (Rx) 14, a round trip time measurement signal generator (RTT SIG GEN) 15, a receiving (Rx) processor 16, an RTT measurement unit (RTT MEAS) 17, a data storage unit or memory 18, and a fault detector 19.

The transmitting processor 11 receives data from the wide area network 02 via optical switching unit OSW1, selects the ONU 04 to which each data frame is addressed, and attaches an identifier identifying the ONU 04 to the frame. The transmitting processor 11 assigns identifiers to ONUs 04 in a registration process carried out when the ONUs 04 are installed. The transmitting processor 11 also generates timings at which outgoing optical data frames can be transmitted from each ONU 04 to the OLT 10 and controls the amount of data per frame according to control information specifying such parameters as the round-trip time (RTT) between the OLT 10 and each ONU 04. The control information is stored in the data storage unit 18.

The optical transmitter 12 transmits frames output from the transmitting processor 11 to the ONUs 04. The wavelength division multiplexer 13 uses a wavelength division technique to multiplex the data, and transmits the multiplexed data frames from the OLT 10 through the optical coupler 03 to the ONUs 04. The wavelength of a downstream optical signal output from the OLT 10 to an ONU 04 is 1.49 micrometers (1.49 μm), and the wavelength of an upstream optical signal output from an ONU 04 to the OLT 10 is 1.31 μm, so that upstream signals do not interfere with downstream signals.

The optical receiver 14 receives the upstream data output from each ONU 04. The receiving processor 16 recognizes the ONU 04 that has transmitted the data frame, from the identifier attached to the frame. The receiving processor 16 also determines whether the received frame is a response to an RTT measurement frame that the OLT 10 has transmitted to the ONU 04, and if so, passes the received frame to the RTT measurement unit 17. If the received frame is not a response to an RTT measurement frame, the receiving processor 16 transmits the received frame to the wide area network 02.

The RTT measurement signal generator 15 generates the RTT measurement frames used for measuring the round trip time between the OLT 10 and each ONU 04. When an ONU 04 is newly connected to the PON and the OLT 10 detects its presence, the RTT measurement signal generator 15 in the interface card to which the ONU 04 is connected generates an RTT measurement frame. The generated RTT measurement frame is transmitted to the ONU 04 through the transmitting processor 11, optical transmitter 12, and wavelength division multiplexer 13.

Upon receiving a response frame transmitted from the ONU 04 that has received an RTT measurement frame, the RTT measurement unit 17 calculates the round trip time between the OLT 10 and the ONU 04, and stores the calculated value in the data storage unit 18. The transmitting processor 11 uses the RTT data and other data stored in the data storage unit 18 to perform the control functions mentioned above and to generate control data frames.

The fault detector 19 detects faults in the interface card in which it is installed, and notifies the fault monitor and control unit 61 when a fault is detected.

The fault monitor and control unit 61 receives the fault indication signals output by the fault detectors 19 in the active interface cards PON IF#1 to PON IF#M. Upon receiving a fault indication signal, the fault monitor and control unit 61 sends a control signal indicating which interface card is faulty to the standby interface card PON IF#K, and sends switching signals to the optical switching units OSW1, OSW2 to switch the faulty interface card over to the standby interface card PON IF#K as described below.

The standby interface card PON IF#K comprises a data storage unit or memory 51, a selector (SEL) 52, a controller 53, a transmitting processor 54, an optical transmitter 55, a wavelength division multiplexer 56, an optical receiver 57, and a receiving processor 58.

The data storage unit 51 has M memory areas corresponding to respective active interface cards PON IF#1 to PON IF#M. Each memory area receives and stores the RTT data and other data stored in the data storage unit 18 in the corresponding active interface card.

The selector 52 responds to a control signal from the controller 53 by selecting one of the memory areas in the data storage unit 51, extracting the RTT data and other data stored in the selected memory area, and sending the extracted data to the transmitting processor 54.

The controller 53 communicates with the fault monitor and control unit 61 and controls the selector 52. When informed by the fault monitor and control unit 61 that one of the active interface cards PON IF#1 to PON IF#M is faulty, the controller 53 generates a control signal that causes the selector 52 to select the memory area in the data storage unit 51 corresponding to the faulty interface card and send the data extracted from the selected memory area to the transmitting processor 54.

The transmitting processor 54 has registers into which the selector 52 writes the RTT data and other data extracted from the data storage unit 51. Using the data stored in these registers, the transmitting processor 54 operates identically to the transmitting processor 11 in the corresponding active interface card.

The optical transmitter 55, wavelength division multiplexer 56, optical receiver 57, and receiving processor 58 are functionally equivalent to the optical transmitter 12, wavelength division multiplexer 13, optical receiver 14, and receiving processor 16 in an active interface card.

The data transmission path forming apparatus includes the optical couplers 03 and the optical fibers connecting the ONUs 04 to the optical couplers 03, the optical couplers 03 to the interface cards in the optical communication system 01, and the interface cards to the wide area network 02. The data transmission paths formed between the wide area network 02 and the interface cards will be referred to as upper data transmission paths, and the optical switching unit OSW1 that switches these data transmission paths will be referred to as the upper optical switching unit; the data paths formed between the interface cards and the ONUs 04 will be referred to as lower data transmission paths, and the optical switching unit OSW2 that switches the lower data transmission paths will be referred to as the lower optical switching unit.

The upper optical switching unit OSW1 includes a downstream optical switch SW1a for selecting interface card PON IF#1 or the standby interface card PON IF#K as the destination of data received from the wide area network 02, and an upstream optical switch SW1b for selecting interface card PON IF#1 or the standby interface card PON IF#K as the source of data transmitted to the wide area network 02. The downstream optical switch SW1a has a first terminal 1 connected to the wide area network 02, a second terminal 2 connected to the transmitting processor 11 in interface card PON IF#1, and a third terminal 3 connected via another downstream optical switch SWKa to the transmitting processor 54 in the standby interface card PON IF#K. The upstream optical switch SW1b has a first terminal 1 connected to the wide area network 02, a second terminal 2 connected to the receiving processor 16 in interface card PON IF#1, and a third terminal 3 connected via another upstream optical switch SWKb to the receiving processor 58 in the standby interface card PON IF#K. Similar pairs of optical switches SW2a, SW2b, . . . connect the other active interface cards PON IF#2 to PON IF#M to the wide area network 02.

Optical switch SWKa has a first terminal 1 connected to the transmitting processor 54 in the standby interface card PON IF#K, a second terminal 2 connected to the third terminals of optical switches SW1a, SW2a, . . . , SWMa (not shown), and a third terminal connected directly to the wide area network 02. Optical switch SWKb has a first terminal 1 connected to the receiving processor 58 in the standby interface card PON IF#K, a second terminal 2 connected to the third terminals of optical switches SW1b, SW2b, . . . , SWMb (not shown), and a third terminal connected directly to the wide area network 02. All of these connections are optical interconnections.

Normally, all of the optical switches in the upper optical switching unit OSW1 are set so that their first and second terminals 1, 2 are interconnected. This means that, for example, the fault monitor and control unit 61 controls optical switches SW1a and SW1b so that the wide area network 02 normally communicates with interface card PON IF#1 in the OLT 10.

The lower optical switching unit OSW2 includes a bidirectional optical switch SW1c for selecting interface card PON IF#1 or the standby interface card PON IF#K. Optical switch SW1c has a first terminal 1 connected through an optical coupler 03 to ONUs #1-1 to #1-N, a second terminal 2 connected to the wavelength division multiplexer 13 in interface card PON IF#1, and a third terminal 3 connected via another bidirectional optical switch SWKc to the wavelength division multiplexer 56 in the standby interface card PON IF#K. Similar optical switches SW2c, . . . connect the other active interface cards PON IF#2 to PON IF#M through the other optical couplers 03 to the other ONUs #2-1, . . . .

Optical switch SWKc has a first terminal 1 connected to the receiving processor 58 in the standby interface card PON IF#K, a second terminal 2 connected to the third terminals of optical switches SW1c, SW2c, . . . , SWMc (not shown), and a third terminal that is normally left unconnected, as shown. All of the connections in the lower optical switching unit OSW2 are optical interconnections.

Normally, all of the optical switches in the lower optical switching unit OSW2 are set so that their first and second terminals 1, 2 are interconnected. This means that, for example, the fault monitor and control unit 61 controls optical switch SW1c so that ONUs #1-1 to #1-N normally communicate with interface card PON IF#1 in the OLT 10.

Figure 4:
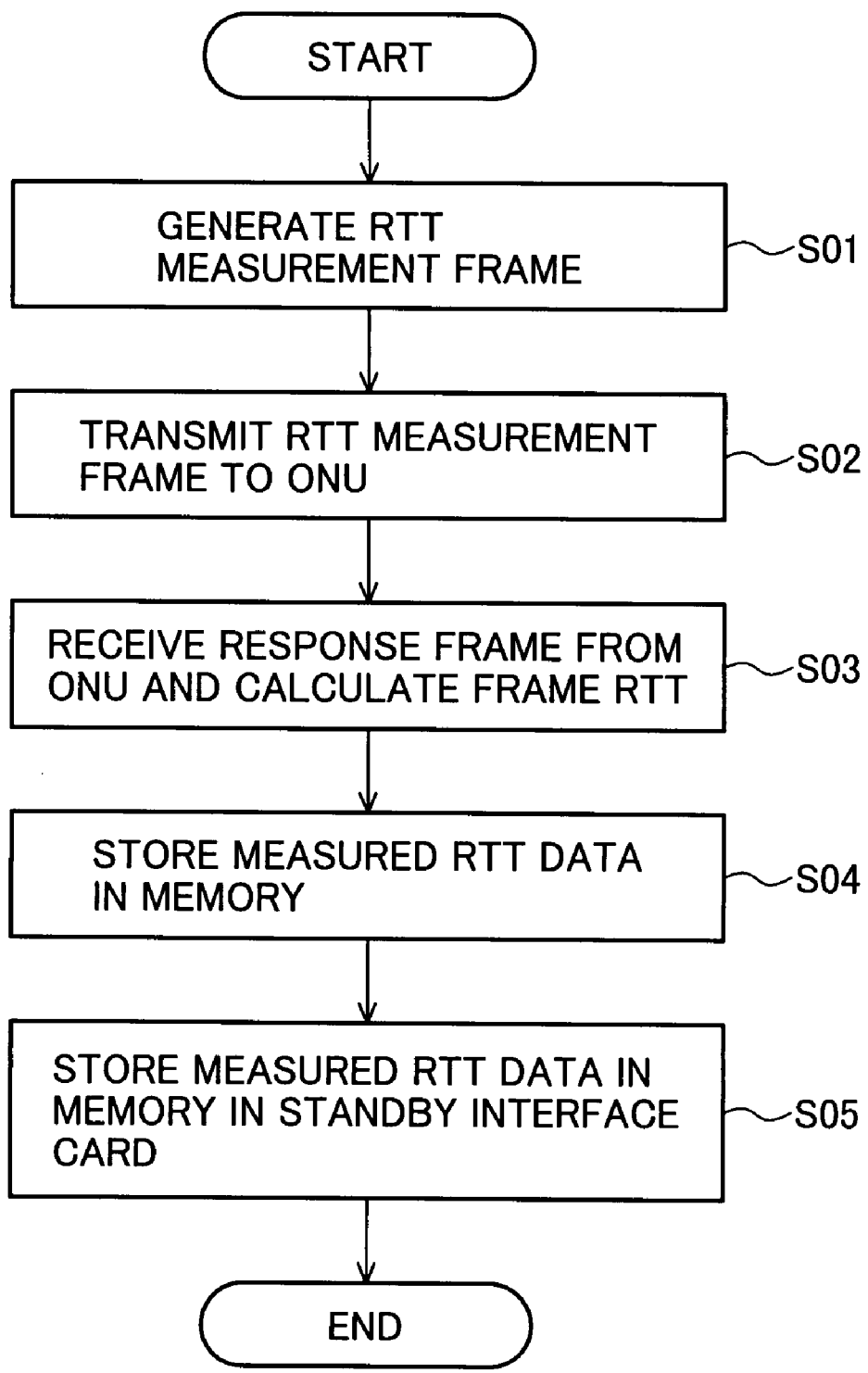
FIG. 4 is a flowchart illustrating the processes of measuring and storing frame round-trip time (RTT) in the system in FIG. 3.

Next, the measurement of frame round trip time between the OLT 10 and each ONU 04 and the storing of the measured time in the OLT 10 will be described with reference to the flowchart in FIG. 4.

In step S01, when a new ONU 04 is connected to one of the optical couplers 03 and thereby to one of the active interface cards PON IF#1 to PON IF#M, the OLT 10 detects its presence and the RTT measurement signal generator 15 in the corresponding active interface card generates an RTT measurement frame for measuring the round trip time between the OLT 10 and the ONU 04.

In step S02, upon receiving the generated RTT measurement frame, the transmitting processor 11 fits the RTT measurement frame into its schedule of downstream data transmissions and transmits the RTT measurement frame to the ONU 04 through the optical transmitter 12 and wavelength division multiplexer 13.

In step S03, upon receiving the RTT measurement frame, the ONU 04 generates a response frame, and transmits this response frame to the OLT 10. The response frame from the ONU 04 reaches the receiving processor 16 through the wavelength division multiplexer 13 and optical receiver 14. The receiving processor 16 recognizes the received frame as a response to the RTT measurement frame and passes the received frame to the RTT measurement unit 17. The RTT measurement unit 17 calculates the frame round trip time as the length of time from transmission of the RTT measurement frame to reception of the response frame by the OLT 10.

In step S04, the calculated frame round trip time is written into the data storage unit 18 in the active interface card that transmitted the RTT measurement frame and received the response.

In step S05, the measured frame round trip time is also stored in the data storage unit 51 in the standby interface card PON IF#K. As described above, the data storage unit 51 in the interface card PON IF#K includes a plurality of memory areas corresponding to the active interface cards PON IF#1 to PON IF#M. Each memory area includes locations for storing N round trip time values for the N ONUs 04 to which the interface card can be connected. The newly measured value is stored in a previously unoccupied one of these memory locations.

In this way, an up-to-date set of round trip time measurement data is maintained in the data storage unit 51. Other necessary control information is also kept up to date in the data storage unit 51 by copying information stored in the data storage units 18 in the active interface cards.

Figure 5:
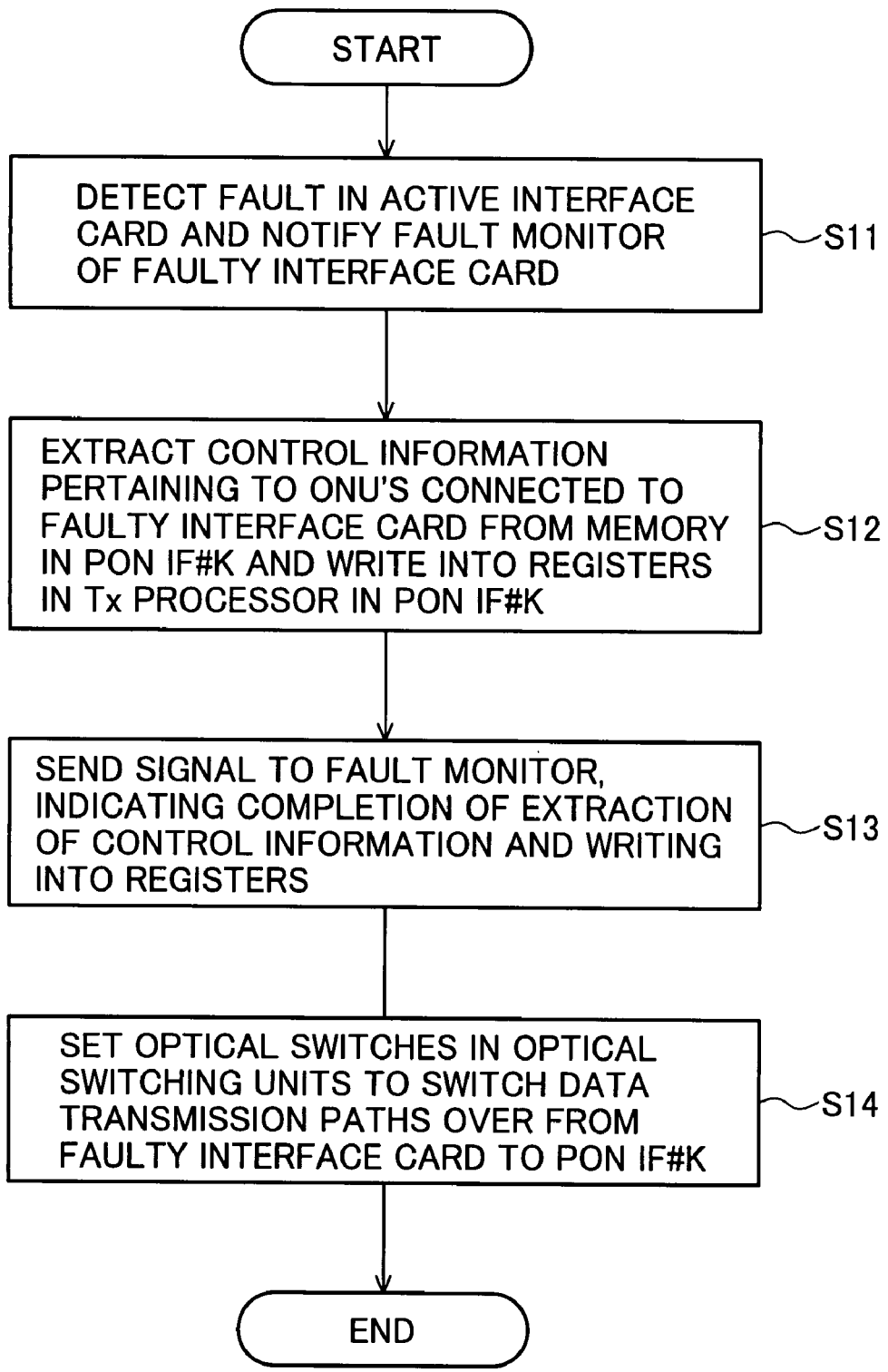
FIG. 5 is a flowchart illustrating the switching of transmission paths and loading of control information in the system in FIG. 3.

Next, the switching of data transmission paths by optical switching units OSW1, OSW2 so that the standby interface card replaces a faulty interface card and the setting of the necessary control information in the transmitting processor 54 in the standby interface card will be described with reference to the flowchart in FIG. 5, taking the case in which a fault occurs in active interface card PON IF#1 as an example.

In step S11, when active interface card PON IF#1 fails in the OLT 10, communication between interface card PON IF#1 and the ONUs 04 to which it is connected becomes faulty. The fault detector 19 in interface card PON IF#1 detects this condition and sends a signal indicating a fault in interface card PON IF#1 to the fault monitor and control unit 61.

In step S12, upon receiving the signal from the fault detector 19, the fault monitor and control unit 61 sends a control signal indicating that interface card PON IF#1 is faulty to the controller 53 in the standby interface card PON IF#K. Upon receiving this control signal from the fault monitor and control unit 61, the controller 53 transmits a control signal to the selector 52 to have it extract the control information pertaining to the ONUs 04 connected to the faulty interface card PON IF#1. Upon receiving the control signal from the controller 53, the selector 52 extracts the frame round trip time measurement data and other necessary control information for the ONUs 04 connected to the faulty interface card PON IF#1 from the memory area assigned to interface card PON IF#1 in the data storage unit 51, and writes this control data into the registers in the transmitting processor 54.

Upon completion of the process in step S12, the controller 53 sends a completion signal to the fault monitor and control unit 61 in step S13, indicating completion of control data setup.

In step S14, the fault monitor and control unit 61 sends switching signals to the optical switching units OSW1, OSW2. These signals set optical switches SW1a, SW1b, and SW1c so that in each switch, the first terminal 1 is connected to the third terminal 3 instead of the second terminal 2. This process switches the data transmission paths that passed through interface card PON IF#1 so that they pass through the standby interface card PON IF#K instead.

Figure 6:
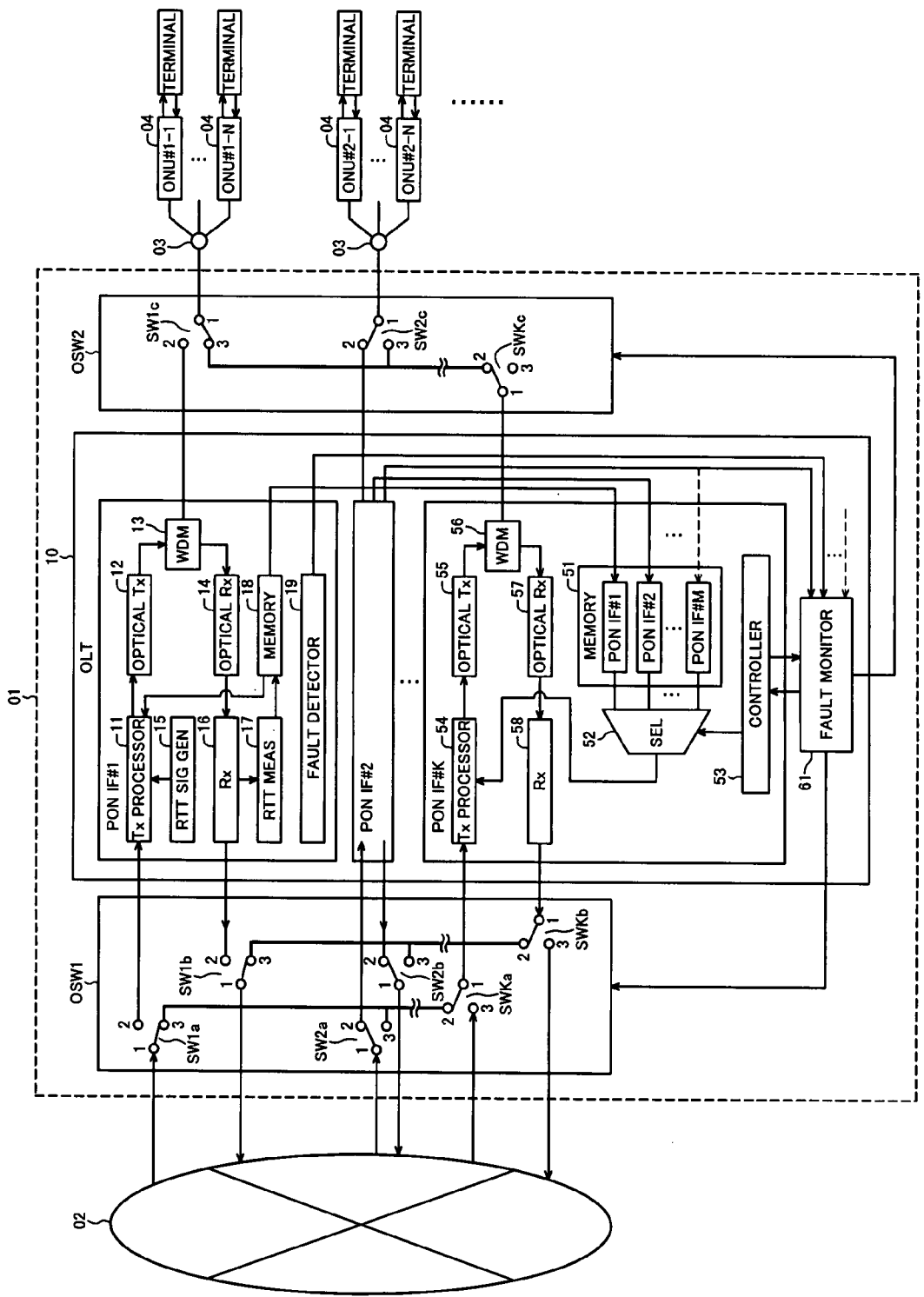
FIG. 6 is a block diagram showing the system in FIG. 3 after a switchover to the standby interface.

FIG. 6 shows the optical communication system 01 after the switching of optical switches SW1a, SW1b, and SW1c in step S14. The upper optical switching unit OSW1 has switched the data transmission paths that led to interface card PON IF#1 before the fault so that these paths now connect the wide area network 02 to the standby interface card PON IF#K. Similarly, the lower optical switching unit OSW2 has switched the data transmission paths that led to interface card PON IF#1 before the fault so that these paths now connect the relevant ONUs 04 (ONU#1-1 to ONU#1-N) to the standby interface card PON IF#K.

Data transmitted downstream from the wide area network 02 to these ONUs 04 (ONU#1-1 to ONU#1-N) now pass through optical switches SW1a, SWKa, the transmitting processor 54, optical transmitter 55, and wavelength division multiplexer 56 in the standby interface card PON IF#K, and optical switches SWKc and SW1c, bypassing the faulty interface card PON IF#1. Data transmitted upstream from ONU#1-1 to ONU#1-N to the wide area network 02 now pass through optical switches SW1c, SWKc, the wavelength division multiplexer 56, optical receiver 57, and receiving processor 58 in the standby interface card PON IF#K, and optical switches SWKb and SW1b. The transmitting processor 54 in PON IF#K controls the amount of data per frame transmitted from each ONU 04 according to the frame round trip time measurement data that were stored in the registers in the transmitting processor 54 in the process described above in step S12.

After the completion of this switchover to the standby interface, the faulty interface card PON IF#1 is removed from the OLT 10 for repair or replacement. The repair or replacement process may include the writing of control data into the data storage unit 18 of the new or repaired interface card. When the new or repaired interface card has been installed in the PON IF#1 slot in the optical communication system 01, optical switches SW1a, SW1b, and SW1c are returned to their normal settings to switch communication over from the standby interface card PON IF#1 to the new or repaired active interface card.

The extraction and writing of control data in steps S12 and S13 takes very little time, and the optical switchover in step S14 is substantially instantaneous, so communication between the wide area network 02 and the ONUs 04 that were connected to interface card PON IF#1 can continue with hardly any interruption. Users of the ONUs 04 connected to interface card PON IF#1 are unlikely to realize that any failure has occurred. For users of the ONUs 04 connected to the other active interface cards PON IF#2 to PON IF#M, of course, there is no interruption of service at all.

Although the OLT 10 in the embodiment described above includes a single standby interface card, the OLT may include a plurality of standby interface cards, to provide the capability to deal with multiple faults.

Figure 7:
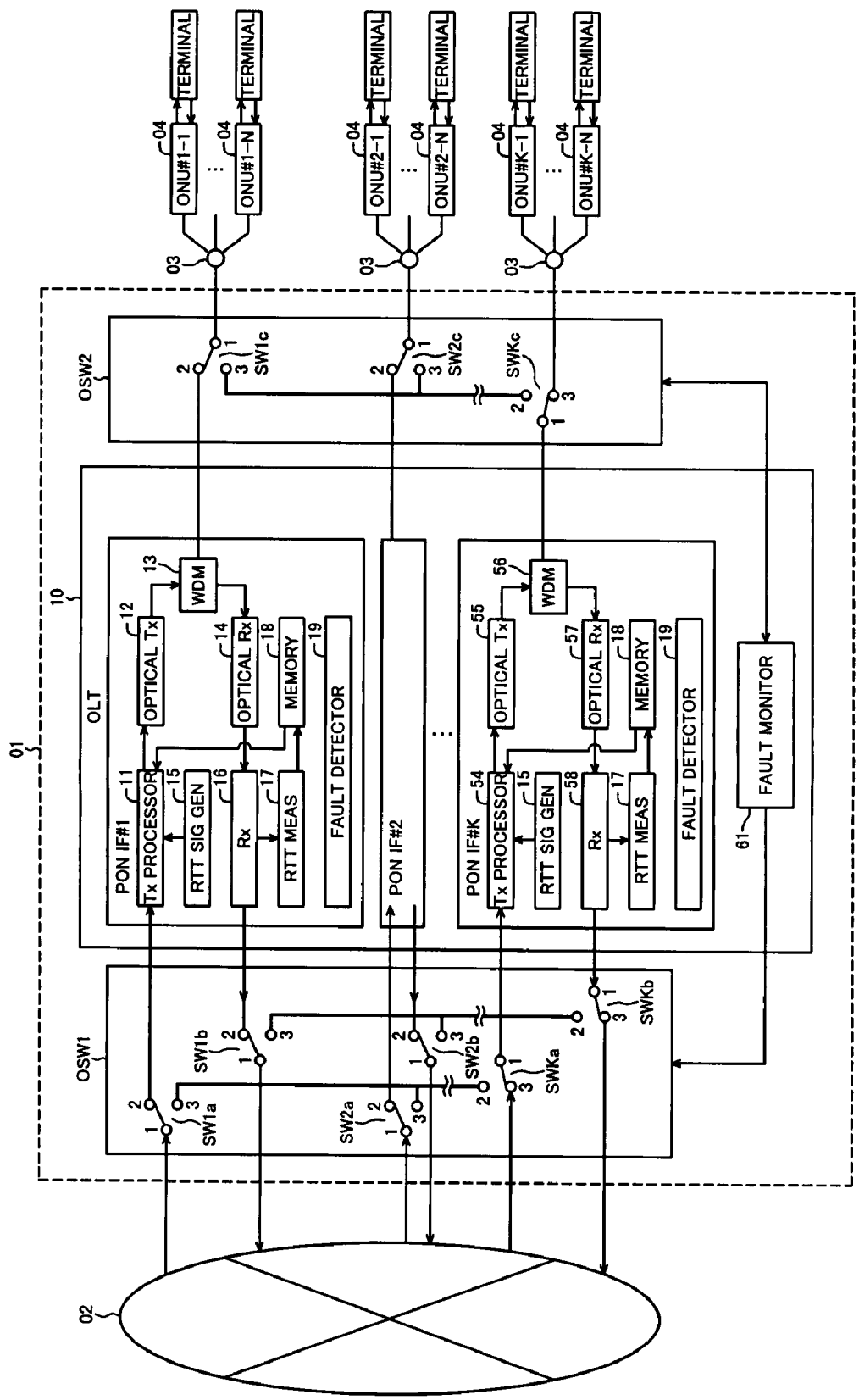
FIG. 7 is a block diagram showing the system in FIG. 3 modified to accommodate additional subscriber lines when the standby interface is not required.

In a system in which redundancy within an OLT is not necessary, the above embodiment can be adapted to provide an extra active interface card. FIG. 7 shows a point-to-multipoint optical communication system with this configuration. The standby interface card has been removed from the PON IF#K slot and replaced with an active interface card having the same structure as active interface cards PON IF#1 to PON IF#M. The OLT 10 still includes a fault monitor and control unit 61, but this fault monitor and control unit 61 is not necessarily connected to the fault detectors 19 in the interface cards. The fault monitor and control unit 61 sends switching signals to the optical switching units OSW1, OSW2 that set optical switches SWKa, SWKb, and SWKc so that their first terminal 1 and third terminal 3 are interconnected. The other optical switches SW1a, SW2a, ..., SW1b, SW2b, ..., SW1c, SW2c, ... are set to their normal positions, with the first terminal 1 and second terminal 2 interconnected. These switch settings provide additional data transmission paths via interface card PON IF#K. The optical communication system 01 can thereby accommodate additional ONUs 04 (ONU#K-1 to ONU#K-N), which are connected to interface card PON IF#K. By increasing the number of ONUs connectable to a single OLT, this scheme reduces communication costs.

In this non-redundant mode, it is not necessary for interface card PON IF#K to have the same structure as the other active interface cards PON IF#1 to PON IF#M. Interface card PON IF#K may be a standby interface card with a data storage unit 51, selector 52, and controller 53 as shown in FIG. 3. The round trip time measurement data and other control data pertaining to ONUs #K-1 to #K-N are stored in the data storage unit 51, selected by the selector 52, and used to control communication between these ONUs and the wide area network 02.

In this arrangement it is also possible to provide a type of dynamic redundancy in which, in the event of a failure, interface card PON IF#K maintains communication with the ONUs 04 connected to two optical couplers 03 at a reduced data rate. If interface card PON IF#1 fails, for example, optical switches SW1a, SW1b, and SW1c can be set so that their first terminals 1 are connected to their third terminals 3, and optical switches SWKa, SWKb, SWKc can be controlled so that their first terminals 1 are connected alternately to their second terminals 2 and third terminals 3. If interface card PON IF#K itself fails, communication at a reduced rate can be maintained with the ONUs 04 that were connected to interface card PON IF#K by switching them over dynamically to one or more of interface cards PON IF#1 to PON IF#M, provided a separate data storage unit is provided in the OLT 10 to store the control data for all the ONUs 04.

As described above, the present invention provides an efficient N+1 redundancy scheme that enables an optical communication system to maintain communication, substantially without interruption, with N sets of users, even if a fault occurs in one of the N interfaces that normally handle the communication. The system is moreover flexible and can easily be adapted for non-redundant communication with N+1 sets of users.

In particular, the invention provides an efficient way to enhance the reliability of a high-capacity passive optical network at a low cost.

Although the optical switches have been shown schematically as mechanical switches with terminals, it will be appreciated that the optical switches may be solid-state switches that route optical signals selectively between one input optical fiber and two output optical fibers, or between two input optical fibers and one output optical fiber. Alternatively, each optical switching unit may be an integrated solid-state device with internal optical switches and waveguides.

Those skilled in the art will recognize that further variations are possible within the scope of the invention, which is defined in the appended claims.

What is claimed is:

1. An optical communication system comprising:
an optical line terminal including a plurality of first interfaces connected to a communication network, each first interface also being connectable to a plurality of subscriber units, for controlling the transmission and reception of optical signals between the communication network and the subscriber units according to control information pertaining to each subscriber unit, and a second interface connectable to any of the subscriber units, each of the first interfaces in the optical line terminal comprising:
a round trip time measurement signal generator for generating a measurement frame for measuring a round trip time between the optical line terminal and each subscriber unit;
means for detecting that a subscriber unit is newly connected to the optical line terminal, and sending the measurement frame to the newly connected subscriber unit;
a round trip time measurement unit for receiving, from the newly connected subscriber unit, a response frame in response to the measurement frame, and measuring the round trip time between the newly connected subscriber unit and the optical line terminal;
a first memory for storing, for each of the subscriber units connected to the first interface, the control information based on the measured round trip time between each subscriber unit and the optical line terminal;
control information transmission means for transmitting the control information to the second interface;
a fault detector for detecting faults in the first interfaces and generating a notification signal indicating which first interface is faulty;
the second interface comprising:
a second memory for storing the control information transmitted from each of the first interfaces, said second memory thereby storing, for each of the subscriber units connected to the optical line terminal, the control information based on the measured round trip time between each subscriber unit and the optical line terminal;
communication control means, for receiving a first control signal indicating the faulty first interface, and controlling the transmission and reception of optical signals between the communication network and the subscriber units according to the control information pertaining to each subscriber unit, which is extracted from the second memory based on the first control signal indicating the faulty first interface; and
an extractor for extracting the control information pertaining to the subscriber units connected to the faulty first interface from the second memory;
the optical line terminal comprising:
data transmission path forming apparatus for forming data transmission paths between the communication network and the first interfaces, between the communication network and the second interface, between the first interfaces and the subscriber units, and between the second interface and the subscriber units; and
a fault monitor and control unit for monitoring a fault in each of the first interfaces and controlling switching of the data transmission paths so that the subscriber units that were connected to the communication network through the faulty first interface are instead connected to the communication network through the second interface, the fault monitor and control unit;
receiving the notification signal indicating occurrence of a fault from any of the first interfaces;
transmitting the first control signal indicating the faulty first interface to the second interface; and
transmitting a second control signal to the data transmission path forming apparatus for replacing the data transmission path between the communication network and the faulty first interface with the data transmission path between the communication network and the second interface, and replacing the data transmission path between the faulty first interface and the subscriber unit with the data transmission path between the second interface and the subscriber unit.

2. The optical communication system of claim 1, wherein the first interfaces are installed on respective first interface cards, and the memory and the second interface are installed on a single second interface card.

3. The optical communication system of claim 2, wherein the fault detector in each first interface is mounted on a first interface card.

4. The optical communication system of claim 2, wherein the first interface cards and the second interface card are mounted in the optical line terminal.

5. The optical communication system of claim 3, wherein the data transmission paths connecting the subscriber units to the switching apparatus form a passive optical network.

6. The optical communication system of claim 3, wherein the data transmission paths include optical couplers disposed between the switching apparatus for switching the data transmission paths and the subscriber units, each optical coupler being coupled by a single optical fiber to the switching apparatus and by separate optical fibers to each of the subscriber units.

7. The optical communication system of claim 6, wherein each of the optical couplers is coupled through the switching apparatus to one of the first interfaces.

8. The optical communication system of claim 6, wherein each of the optical couplers passively branches optical signals from the switching apparatus onto the separate optical fibers, and passively combines optical signals from the separate optical fibers onto the single optical fiber.

9. The optical communication system of claim 3, wherein the switching apparatus comprises:
   an upper optical switching unit including a plurality of upper optical switches disposed on the data transmission paths between the communication network and the first interfaces; and
   a lower optical switching unit including a plurality of lower optical switches disposed on the data transmission paths between the subscriber units and the first interfaces.

10. The optical communication system of claim 9, wherein the upper optical switches comprise:
    a plurality of downstream optical switches connected to respective first interfaces, each downstream optical switch being operable to send optical signals from the communication network selectively to the connected one of the first interfaces and to the second interface; and
    a plurality of upstream optical switches connected to respective first interfaces, each upstream optical switch being operable to send optical signals from the connected one of the first interfaces and from the second interface selectively to the communication network.

11. The optical communication system of claim 9, wherein the lower optical switches comprise:
    a plurality of bidirectional optical switches connected to respective first interfaces, each bidirectional optical switch being operable to pass optical signals between the connected one of the first interfaces and the subscriber units, and between the second interface and the subscriber units.

12. The optical communication system of claim 9, wherein the upper optical switching unit further includes a first optical switch having a first state that connects the second interface directly to the optical communication network and a second state that connects the second interface to the upper optical switches; and
    the lower optical switching unit includes a second optical switch having a third state that connects the second interface directly to at least one additional subscriber unit and a fourth state that connects the second interface to the lower optical switches.

13. The optical communication system of claim 1, further comprising:
    switching apparatus for switching the data transmission paths,
    wherein the fault monitor and control unit controls the switching apparatus for switching the data transmission paths so that the subscriber units that were connected to the communication network through the faulty first interface are instead connected to the communication network through the second interface.

* * * * *